United States Patent [19]

de Boer

[11] 4,213,144
[45] Jul. 15, 1980

[54] METHOD OF MODULATING A COMPOSITE COLOR TELEVISION SIGNAL ON A CARRIER SIGNAL AND DEVICE FOR CARRYING OUT SAID METHOD

[75] Inventor: Eeltje de Boer, Eindhoven, Netherlands

[73] Assignee: U.S. Philips Corporation, New York, N.Y.

[21] Appl. No.: 933,960

[22] Filed: Aug. 15, 1978

[30] Foreign Application Priority Data

May 16, 1978 [NL] Netherlands .......................... 7805231

[51] Int. Cl.² .............................................. H04N 9/02
[52] U.S. Cl. ......................................... 358/12; 358/13
[58] Field of Search ........................... 358/8, 12, 15, 16

Primary Examiner—Robert L. Richardson

Attorney, Agent, or Firm—Thomas A. Briody; William J. Streeter; Edward W. Goodman

[57] ABSTRACT

A method of modulating a composite color television signal on a carrier wave. The luminance signal is frequency-modulated on the carrier wave. The chrominance signal is translated to a subcarrier wave frequency either by mixing the modulated carrier wave or frequency modulating the carrier wave with said chrominance signal. Subsequently, the carrier wave is pulse-width modulated with said subcarrier wave. In this way a signal is obtained from which the original color television signal can be recovered by a single frequency demodulation operation, while the normally occurring undesired interference components can be reduced substantially.

12 Claims, 7 Drawing Figures

METHOD OF MODULATING A COMPOSITE COLOR TELEVISION SIGNAL ON A CARRIER SIGNAL AND DEVICE FOR CARRYING OUT SAID METHOD

BACKGROUND OF THE INVENTION

The invention relates to a method of modulating a composite colour television signal, comprising a luminance signal and a chrominance signal with a fixed chrominance subcarrier frequency, on a carrier wave, the luminance signal being frequency-modulated on the carrier signal and the chrominance signal being modulated on the carrier wave in such a way that the original composite colour television signal can be recovered by a single frequency demodulation of said modulated carrier signal.

The invention is especially of significance for systems in which a colour television signal is recorded on a record carrier. In such systems the use of a coding is required which utilizes the limited bandwidth imposed by the record carrier in a most effective manner, while, furthermore, a coding should be used which enables the original colour television signal to be recovered in a simple manner during readout of said record carrier.

A modulation method of the type mentioned in the preamble which meets this last-mentioned requirement is the frequency-modulation of the carrier signal by the composite colour television wave. If a carrier wave thus modulated is recorded on the record carrier the original composite colour television signal can be recovered during reproduction by a single frequency demodulation of said modulated carrier wave, which is obviously beneficial for the simplicity of the reproducing apparatus.

In the case of such a frequency modulation of the carrier wave by the composite colour television signal, the chrominance signal gives rise to side-band components which are situated at frequency distances equal to the chrominance subcarrier frequency from those of the carrier wave.

If because of the limited bandwidth of the record carrier a comparatively low frequency is selected for the carrier wave, said side band components may give rise to considerable interference. This may be the case in particular if the second-order lower side band component extends into the negative frequency range and consequently manifests itself as a so-called "folded-back" side band component in the positive frequency range within the frequency band occupied by the frequency-modulated carrier wave. In the reproduced picture this "folded-back" lower side band component then gives rise to an interference effect which is also referred to as moire effect.

In order to avoid this undesired interference effect, the frequency of the carrier wave is generally selected so high that the said second-order lower side band component is situated outside the frequency band occupied by the frequency modulated carrier wave, in particular the first-order side bands.

SUMMARY OF THE INVENTION

It is the object of the invention to provide a modulation method which is considerably less susceptible to said interference effect, while the possibility of recovering the colour television signal by a single frequency demodulation is maintained.

For this, the method in accordance with the invention is characterized in that the chrominance signal is translated to the frequency of a subcarrier wave which is situated at a frequency distance equal to the chrominance subcarrier frequency below the frequency of the carrier wave which has been frequency-modulated by the luminance signal, and that said frequency-modulated carrier wave is pulse-width modulated by the subcarrier wave.

The invention is based on the recognition that through pulse-width modulation of the carrier wave by the subcarrier wave, a signal is obtained whose frequency spectrum with respect to the location of the frequencies of the various relevant spectral components is identical to the frequency spectrum of a signal obtained through frequency modulation of the carrier wave by the composite colour television signal. This means that the signal obtained by the inventive method allows the original composite colour television signal to be recovered with the aid of a single frequency demodulation operation. However, it has been found that due to the specific manner of modulation in accordance with the inventive method, the influence of the spectral interference components mentioned in the preamble is substantially reduced, which will be explained hereinafter.

The translation of the chrominance signal to the desired subcarrier wave frequency can be performed in different manners. In accordance with a first variant said chrominance signal is translated by mixing said chrominance wave with the carrier signal which has been frequency-modulated by the luminance signal. This variant enables the pulse-width modulation to be obtained in a simple manner, starting from the modulated carrier wave with finitely steep edges, to which the subcarrier wave is added, after which the sum signal is symmetrically limited.

A second variant of the method in accordance with the invention is characterized in that the chrominance signal is translated by frequency-modulating the carrier wave with said chrominance signal, and that the pulse-width modulation is obtained by restricting the bandwidth of the modulated carrier wave and symmetrically limiting said wave.

DESCRIPTION OF THE DRAWINGS

The invention will now be described in more detail with reference to the drawing, in which

FIG. 5 shows a second embodiment of a device for carrying out the inventive method, while

DESCRIPTION OF THE PREFERRED EMBODIMENTS

Figure 1:
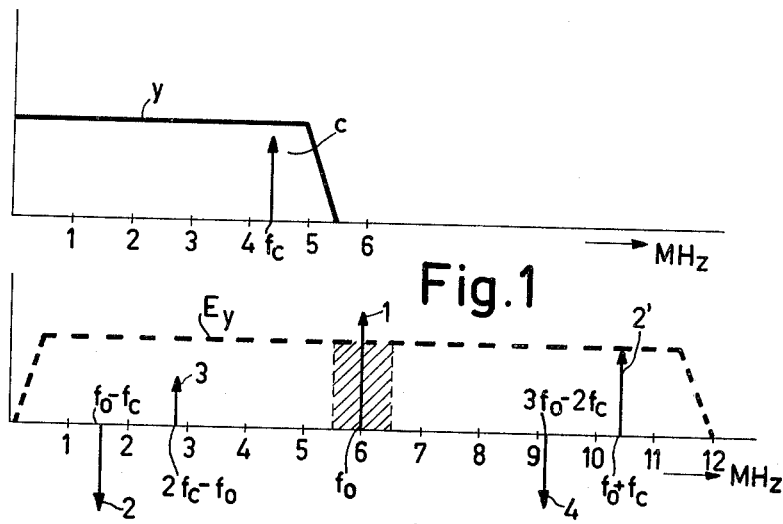
FIG. 1 represents the frequency spectrum of a PAL standard colour television signal.

In the frequency spectrum of a PAL standard colour television signal, shown in FIG. 1, the luminance signal Y occupies a bandwidth of approximately 5 MHz. The bandwidth of this luminance signal Y includes a chrominance signal C with a frequency $f_c = 4.43$ MHz on which two colour signals are quadrature-modulated.

Figure 2:
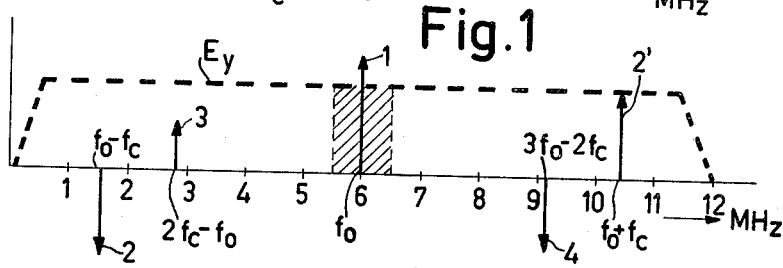
FIG. 2 represents the frequency spectrum of a carrier wave which has been frequency-modulated by said colour television signal.

FIG. 2 illustrates the frequency spectrum of a signal obtained by frequency-modulating a carrier wave with such a PAL standard colour television signal. For this it has been assumed that for the frequency modulation, a frequency sweep of 5.5 to 6.5 MHz (hatched area) is used, 5.5 MHz, for example, appearing at the sync. level and 6.5 MHz at the peak-white level of the luminance signal. The first-order side bands of the frequency-modulated signal extend between the frequencies 0 and 12 MHz, as is indicated by the frequency band $E_y$ in the Figures.

In order to illustrate the spectral location of the frequencies of the lower-side band components as a result of the chrominance signal C in a simple manner, the FIG. 2 is based on a carrier wave 1 with an instantaneous frequency $f_o = 6$ MHz. The first-order side band components produced by the chrominance signal C then yield a frequency component 2 at a frequency $f_o - f_c$ and a frequency component 2' at a frequency $f_o + f_c$. These two components 2 and 2' have equal amplitudes but opposite polarities and, consequently, represent a pure frequency modulation of the carrier wave 1.

Frequency modulation also gives rise to second and higher order side band components related to the chrominance signal C. If it is assumed that the modulation index is selected to be so small that only the second-order side band components are of significance, only the second-order lower side band will appear within the frequency band shown in FIG. 2. This second-order lowerside-band component is situated at a frequency distance of $2f_c$ relative to the carrier wave 1 frequency $f_o$ and consequently lies in the negative frequency range. As a result of this, said component will appear "folded-back" in the positive frequency range, resulting in a component 3 at a frequency $2 f_c - f_o$.

In the case of a symmetrical squarewave-shaped frequency modulated signal, the frequency spectrum also contains odd harmonics of the carrier signal and side band components around these harmonics. Because of their magnitude and frequency location most of these components are of no significance. However, the second-order lower side band component corresponding to the third harmonic of the carrier wave 1 appears within the frequency band $E_y$. This component 4 has a frequency $3 f_o - 2 f_c$. Comparison of the frequency components 3 and 4 reveals that they both have a frequency distance of $2 f_o - 2 f_c$ to the carrier wave 1 frequency $f_o$ and also that they have opposing polarities. This means that these two components 3 and 4 essentially represent a frequency modulation of the carrier wave 1, at least with respect to their common amplitude. However, this also means that in the case of frequency demodulation of the frequency-modulated signal these two components 3 and 4 give rise to a component with a frequency $2f_o - 2 f_c$ in the demodulated signal, which component manifests itself as an interference signal in the reproduced picture.

Figure 3:
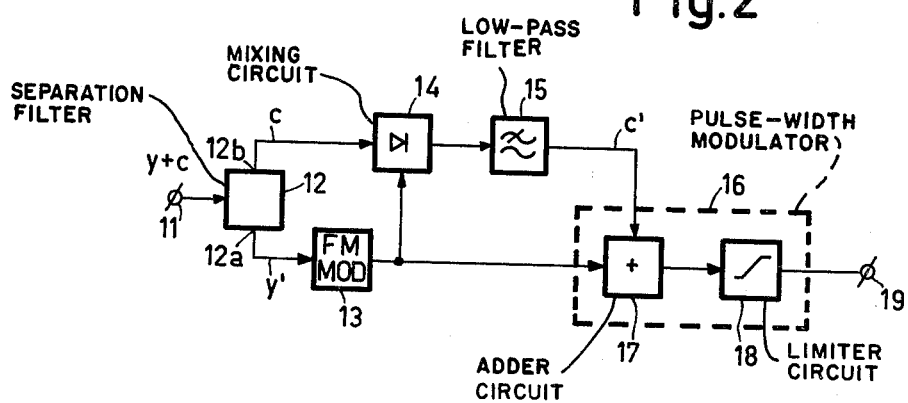
FIG. 3 shows a first embodiment of the device for carrying out the inventive method.
Figure 4:
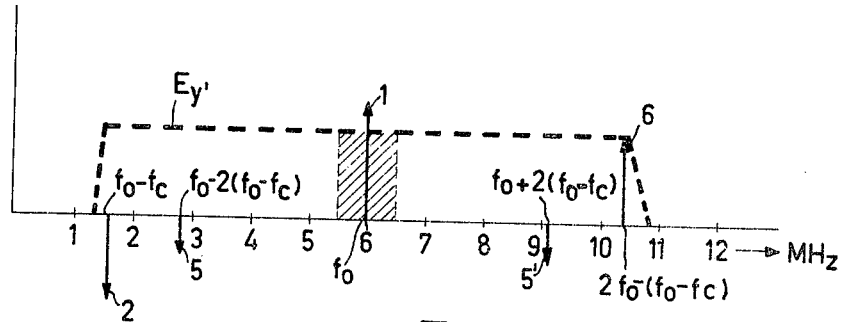
FIG. 4 represents the frequency spectrum of the signal obtained with the aid of said device.

FIG. 3 shows an embodiment of a device for carrying out the inventive method and FIG. 4 represents the frequency spectrum of the resulting signal. Again a standard PAL colour television signal Y+C is used, which is applied to an input terminal 11. In a separation filter 12, the luminance signal Y and the chrominance signal C are separated from each other. This can be effected with the aid of a low-pass filter having a bandwidth of for example 4 MHz for extracting the luminance signal and a band-pass filter having a pass-band around the frequency $f_c$ of the chrominance signal C for the extraction of this chrominance signal C. The luminance signal Y', whose bandwidth has been limited to 4 MHz, then appears on the output 12a of the separation filter 12. This luminance signal Y' is applied to a frequency modulator 13, in which this luminance wave is modulated on a carrier signal. If, for this frequency modulation, it is assumed that a frequency sweep of 5.5 MHz to 6.5 MHz is used, this frequency modulation will result in a spectrum whose first-order side bands extend between approximately 1.5 and 10.5 MHz, as is represented by $E_y$, in FIG. 3.

Said frequency-modulated carrier wave is applied to a mixing circuit 14, which, moreover, receives the chrominance signal C. The difference frequency of the frequencies, obtained by mixing, is extracted with the aid of a low-pass filter 15. Thus, at the output of this low-pass filter 15 a subcarrier wave C' becomes available which has a frequency $f_o - f_c$ and on which the chrominance signal C is modulated, assuming again that $f_o$ is the instantaneous frequency of the frequency-modulated carrier wave. This means that this subcarrier wave C' always has the same frequency as the component 2 shown in the frequency spectrum of FIG. 2.

The frequency-modulated carrier wave on the output of the FM modulator 13 and the modulated subcarrier wave C' on the output of the low-pass filter 25 are now applied to a pulse-width modulator 16. In this pulse-width modulator 16, the rising and falling edges of the frequency-modulated carrier wave are shifted in opposite directions depending on the modulated subcarrier wave C'. For this pulse width modulation, several possibilities are known which will be discussed in more detail hereinafter.

In the embodiment shown, the pulse-width modulator 16 comprises an adder circuit 17, to which the two said signals are applied. For this it is assumed that the frequency modulated carrier wave has finitely steep edges. This can be achieved by suitable choice of the frequency modulator 13. Alternatively, a frequency modulator may be used which supplies a square-wave signal, while a low-pass filter is used, which has a pass-band which is limited to the first-order side bands of the frequency-modulated carrier wave, for example, having a cut-off frequency of 12 MHz.

The sum signal on the output of the adder circuit 17 is applied to a limiter circuit 18, which limits this signal symmetrically and thus yields a squarewave signal on the output terminal 19 whose consecutive edges are shifted in the appropriate manner relative to those of the frequency-modulated carrier wave. This simple method of obtaining pulse width modulation has been described comprehensively in U.S. Pat. No. 3,893,163, herein incorporated by reference.

The frequency spectrum of the signal on the output terminal 19, designated by $E_y'$, comprises the frequency components of the frequency-modulated carrier wave. Furthermore, the pulse-width modulation with the modulated subcarrier wave C', first of all, gives rise to a frequency component with a frequency equal to that of the subcarrier wave C', i.e. $f_o - f_c$. This frequency component fully corresponds to the component 2 in the frequency spectrum $E_y$ of FIG. 2 with respect to its spectral location, which is the reason why this frequency component is designated 2 in FIG. 4.

In the case of symmetrical pulse width modulation, only even-order side band components are produced around the carrier wave 1, i.e. frequency components at frequency distances of $2n(F_o-f_c)$, n being an integer, from the carrier wave 1. Thus, the side band components which are of significance for the specified frequency band are a component 5 at a frequency $f_o-2(f_o-f_c)$ and a component 5' at a frequency $f_o+2(f_o-f_c)$.

Furthermore, only odd side-band components appear around the second harmonic of the carrier wave 1, which itself is not present. As a result of this, a component 6 also appears within the relevant frequency band, which is the first-order side band component of said second harmonic of the carrier signal and which is situated at a frequency $2f_o-(f_o-f_c)=f_o+f_c$. If the modulation index for the pulse-width modulation is not too high, the higher-order side band components may be neglected, so that the frequency spectrum of FIG. 4 is then representative of all essential components within the relevant frequency band.

So far, only the spectral location of the various frequency components has been considered. If, furthermore, the polarities of the various frequency components are considered, it is found, as is indicated in the Figure by the direction of the vectors, that the frequency components 2 and 6 have opposite polarities, while the frequency components 5 and 5' have the same polarities. Moreover, it is found that the two frequency components 2 and 6 have equal amplitudes, which also applies to the components 5 and 5'.

If the frequency spectrum of FIG. 4 is compared with that of FIG. 2, it is found that the location and polarities of the frequency components 2 and 6 in FIG. 4 relative to the carrier wave 1, fully correspond to those of the frequency components 2 and 2' in FIG. 2. This means that in the case of frequency demodulation of the carrier wave 1 with a frequency spectrum in accordance with FIG. 4, in addition to the bandwidth limited luminance signal Y', again a chrominance signal C with the fixed chrominance subcarrier wave frequency $f_c$ is obtained. An essential difference between the two frequency spectra is that in contradistinction to the components 3 and 4 and the frequency spectrum of FIG. 2, the components 5 and 5' in the frequency spectrum of FIG. 4 have the same polarities. This means that these two components 5 and 5' together represent a pure amplitude modulation of the carrier wave 1. However, this implies that in the case of frequency demodulation of the carrier wave 1 with a frequency spectrum in accordance with FIG. 4, these two components 5 and 5' cannot give rise to undesired interference.

Thus, the modulation method described for the device in accordance with FIG. 3 ensures that the normally occurring interference effects are effectively avoided, while the possibility of recovering the composite colour television signal, with the aid of a single frequency demodulation operation, is maintained.

The only difference with a single FM modulation system is that by the use of the low-pass filter for separating the luminance signal Y and the chrominance signal C in the separation filter 12 of FIG. 3, the bandwidth of the luminance signal Y is slightly limited. However, for many applications this will present hardly any problem. However, should this present a problem, then it is obviously possible, in known manner, to employ comb filters in the separation filter 12 for separation the luminance signal Y and the chrominance signal C, so that hardly any bandwidth limitation occurs.

Figure 5:
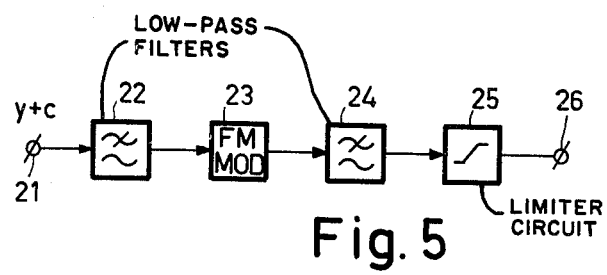

As previously stated, several possibilities are known for realizing the pulse-width modulation. FIG. 5 of the previously cited U.S. Pat. No. 3,893,163 for example, indicates a method which employs two variable delay devices whose delay times are controlled in an opposite sense by the modulating carrier wave. The signal to be modulated is split into two subcarrier waves which respectively represent the rising and falling edges of the wave, which two subcarrier waves are individually applied to one of the two delay devices. The pulse-width modulated signal is then obtained by recombining the two output signals of the delay lines to one signal, consecutive edges of this signal being alternately determined by these two output signals.

A third possibility is the use of a limiter circuit with variable limiting level. If the carrier wave to be modulated is applied to such a limiting circuit and the two limiting levels are varied inphase depending on the modulating signal, the desired pulse-width modulation is also obtained.

With respect to the amplitudes of the various frequency components in the frequency spectrum of FIG. 4, the following is to be noted. These amplitudes depend on the modulation index of the pulse-width modulation, which is determined by the amplitude ratio of the carrier wave 1 and the subcarrier wave C'. This means that the amplitudes of the said frequency components, in particular the components 2 and 6, can be brought at a desired value by adapting said amplitude ratio. In the device of FIG. 3, this may, for example, be realized by including an amplifier with a specific gain factor behind the low-pass filter 15 or behind the frequency modulator 13. If the amplitudes of the frequency components 2 and 6 in the frequency spectrum of FIG. 4 should be equal to those of the frequency components 2 and 2' in the frequency spectrum of FIG. 2, it is found that before pulse-width modulation the amplitude ratio between the subcarrier wave C' and the carrier wave 1 should be increased by substantially a factor two.

Figure 6:
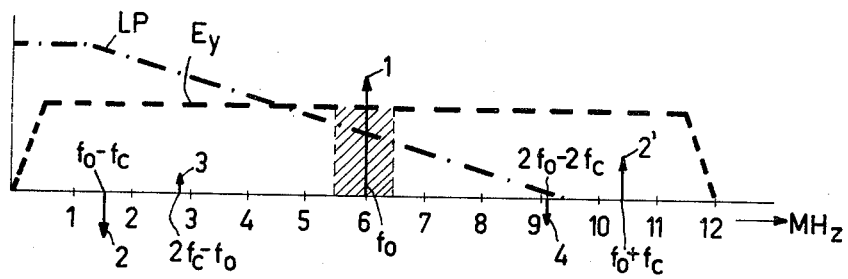
FIGS. 6 and 7 represent the frequency spectra of the associated signals.
Figure 7:
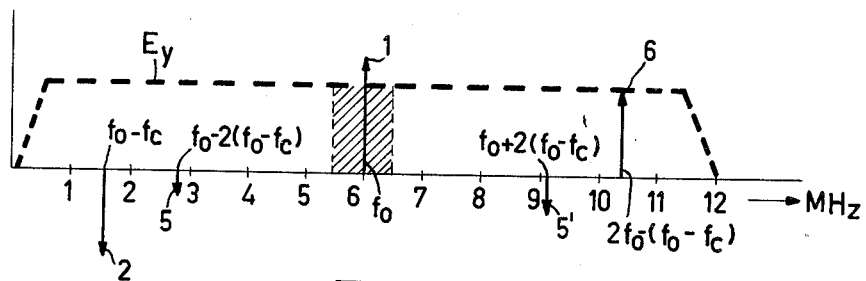

FIG. 5 shows a second very simple embodiment of a device for carrying out the inventive method, while FIGS. 6 and 7 represent the frequency spectra of the associated waves.

The device of FIG. 5 comprises an input terminal 21 to which the composite colour television signal Y+C (FIG. 1) is applied. This input terminal 21 is connected to a filter 22 which serves to reduce the amplitude of the chrominance signal C. For this purpose, the filter 22 may be a low-pass filter having a cut-off frequency below the chrominance subcarrier wave $f_c$ and, in conjunction with this cut-off frequency, having such a slope that the desired attenuation is obtained at the chrominance subcarrier wave frequency $f_c$. Alternatively, this filter may be a band-stop filter, the stop band being situated around the chrominance subcarrier wave frequency $f_c$, and the attenuation level of this stop band having the desired value.

The composite colour television signal Y+C, which has thus been modified, is then applied to a frequency modulator 23. Assuming that the same carrier wave frequency and frequency sweep are selected as for the frequency modulation described with reference to FIG. 2, this frequency modulation results in a signal with a spectrum as shown in FIG. 6. The location of the various spectral components is obviously identical to the frequency spectrum of FIG. 2, which is the reason why these components bear the same reference numerals. The difference with the frequency spectrum of FIG. 2 resides in the amplitudes of the various components. As the amplitude of the chrominance signal C has been reduced with the aid of the filter 22, the amplitudes of the first-order side band components 2 and 2' will be proportionally smaller, while the amplitudes of the second-order side band components 3 and 4 will be reduced in accordance with a square-law function. This is because the amplitudes of the first-order side band components of a frequency-modulated signal is proportional to the modulation index, while the amplitudes of the second-order side band components are proportional to the square of this modulation index, which, in its turn, is proportional to the amplitude of the modulating signal, in the present instance, the chrominance signal C.

This means that in the frequency-modulated signal at the output of the frequency modulator 23, inter alia the amplitude ratio of the components 2 and 3 has been increased relative to the situation in the spectrum of FIG. 2. This frequency-modulated signal is applied to a low-pass filter 24 having an amplitude-frequency response with a cut-off frequency below the carrier wave frequency, for example a characteristic as represented by LP in FIG. 6. This low-pass filter 24 ensures that on its output a signal is obtained which is essentially the sum of three signal components, namely the components 1, 2 and 3. Moreover, this low-pass filter 24 ensures that the amplitude ratio between the component 2 and the carrier wave 1 is increased again. This is of importance for the operation to which the output signal of this low-pass filter 24 is subjected. This output signal is applied to a limiter circuit 25, which limits said signal symmetrically. This operation corresponds to a pulse-width modulation of the carrier wave 1 by the low-frequency components 2 and 3.

In analogy with the frequency spectrum shown in FIG. 4, a signal with a frequency spectrum as shown in FIG. 7 is thus obtained on the output terminal 26. The principal components in this spectrum can be derived from the pulse-width modulation of the carrier wave 1 by the subcarrier wave 2 (FIG. 6). This pulse width modulation yields a frequency spectrum which, with respect to the frequency location and polarities of the components, is identical to the frequency spectrum of FIG. 4. A slight deviation from the frequency spectrum of FIG. 4 is the result of the pulse width modulation of the carrier wave 1 by the frequency component 3 (FIG. 6). Since the amplitude of this component 3 is substantially smaller than that of the component 2, the ultimate contribution to the total frequency spectrum as a result of the pulse width modulation of the carrier wave 1 by this component 3 is small. As first-order components, this pulse-width modulation yields a component at the frequency $2 f_c - f_o$ of the component 3 itself and a component at a frequency $2 f_o - \{f_o - 2(f_o - f_c)\}$, which components having opposite polarities. As can be seen, which components coincide, with respect to their frequency location, with the two components resulting from the pulse width modulation of the carrier wave 1 by the subcarrier wave 2, and together yield the two components 5 and 5' in the frequency spectrum of FIG. 7. In contradistinction to the frequency spectrum of FIG. 4, these two components 5 and 5' are not exactly equal, but exhibit a slight amplitude deviation.

This means that the two components 5 and 5' together yet provide a small contribution to the frequency modulation of the carrier wave 1. This is because these two components 5 and 5' may be assumed to consist of two components of equal amplitude and equal polarity, which together represent a pure amplitude modulation of the carrier wave 1, and two components with equal amplitude and opposite polarity, which together represent a pure frequency modulation of the carrier wave 1. Since the amplitude of the last-mentioned components is determined by the, only slight, difference between the components 5 and 5', this means that the influence of these components on the signal obtained after frequency demodulation is very small, so that the system of FIG. 5 also gives a substantial reduction of the undesired component in the case of pure frequency modulation.

The amplitudes of the various frequency components in the frequency spectrum of FIG. 7 are determined by the modulation index in the case of pulse width modulation, which, in its turn, is determined by the amplitude ratio of the modulating signal, i.e. the subcarrier wave 2, and the carrier wave 1. Since this amplitude ratio can be increased by an appropriate factor with the aid of the low-pass filter 24, it can thus be achieved that the amplitudes of the relevant components 2 and 6 in the frequency spectrum of FIG. 7 have the desired values. In fact, this enables the reduction of the amplitudes of these components as a result of the reduction of the chrominance subcarrier wave C', prior to the frequency modulation, to be compensated completely or partly.

Instead of a low-pass filter 24, it is obvious that a band-stop filter may be used having a stop band around the carrier wave frequency $f_o$ and a suitable stop band level.

What is claimed is:

1. A method of modulating a composite color television signal, having a luminance signal and a chrominance signal with a fixed chrominance subcarrier wave frequency, on a carrier wave, the luminance signal being frequency-modulated on the carrier wave and the chrominance signal being modulated on the carrier wave whereby the original composite color television signal can be recovered by a single frequency demodulation of said modulated carrier wave, wherein said method comprises translating the chrominance signal to the frequency of a subcarrier wave which is situated at a frequency distance equal to the chrominance signal frequency below the frequency of the carrier wave which has been frequency modulated by the luminance signal, and then pulse-width modulating said frequency-modulated carrier wave with the chrominance subcarrier wave.

2. A method as claimed in claim 1, wherein the chrominance signal is translated by mixing said chrominance signal with the carrier wave which has been frequency-modulated by the luminance signal.

3. A method as claimed in claim 2, wherein the pulse-width modulation is obtained by adding the chrominance subcarrier wave to the modulated carrier wave having finitely steep edges, and then limiting the sum signal symmetrically.

4. A method as claimed in claim 3, wherein prior to the addition of the subcarrier wave to the modulated carrier wave, the amplitude ratio between the subcarrier wave and the carrier wave is changed.

5. A method as claimed in claim 1, wherein the chrominance signal is translated to the subcarrier wave by frequency-modulating the carrier wave with said chrominance signal, and that the pulse-width modulation is obtained by restricting the bandwidth of the modulated carrier wave and symmetrically limiting said wave.

6. A method as claimed in claim 5, wherein prior to the frequency modulation of the carrier wave by the chrominance signal, the amplitude of the chrominance signal is reduced.

7. A method as claimed in claim 5 or 6, wherein, in the frequency-modulated carrier wave, the amplitude ratio between the subcarrier wave and the carrier wave is increased prior to the limitation.

8. A device for carrying out the method as claimed in claim 2, wherein the device comprises a separation filter for separating the luminance signal and the chrominance signal, a frequency modulator coupled to said separation filter for the frequency modulation of a carrier wave with the luminance signal, a mixing circuit which is coupled to the frequency modulator for receiving the modulated carrier wave and to the separation filter for receiving the chrominance signal, a filter which is coupled to the output of the mixing circuit for extracting the chrominance subcarrier wave, and a pulse-width modulator, coupled to said filter and to the output of the frequency modulator, for the pulse-width modulation of the modulated carrier wave by the chrominance subcarrier wave.

9. A pulse width modulator for carrying out the method as claimed in claim 3, comprising an adder circuit having a first input for receiving the modulated carrier wave, a second input for receiving the chrominance subcarrier wave, and an output, and a limiter circuit which is coupled to said output.

10. A device for carrying out the method as claimed in claim 5, wherein the device comprises a frequency modulator for frequency-modulating a carrier wave with the composite colour television signal, a filter for limiting the bandwidth of the modulated carrier wave, and a limiter circuit for symmetrically limiting said modulated carrier wave.

11. A device as claimed in claim 10, wherein the composite colour television signal is applied to the frequency modulator via a filter for reducing the amplitude of the chrominance signal therein.

12. A device as claimed in claim 10, wherein between the frequency modulator and the limiter circuit, a filter is included for increasing the amplitude ratio between the subcarrier wave and the carrier wave.

* * * * *